Patented Mar. 12, 1935

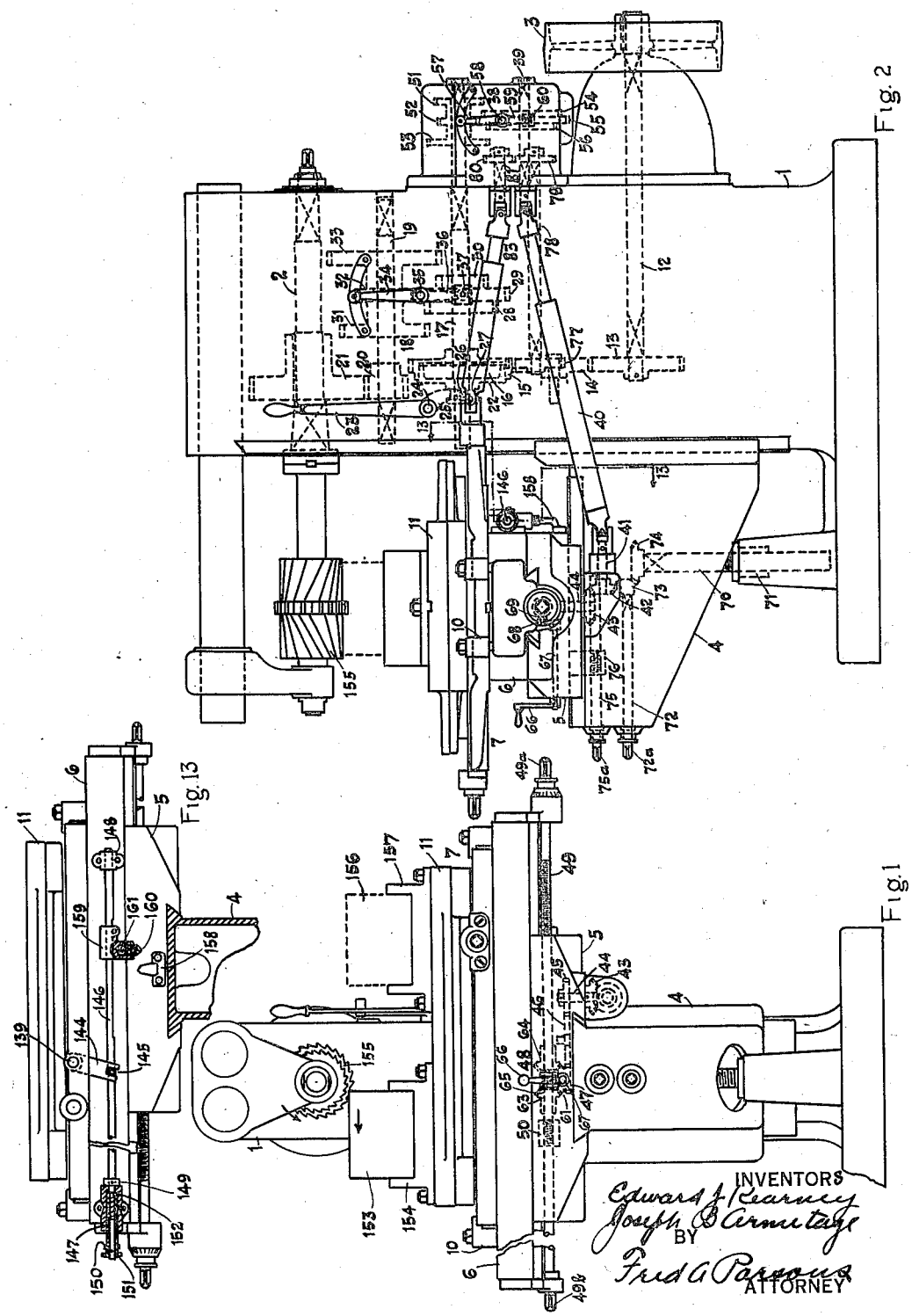

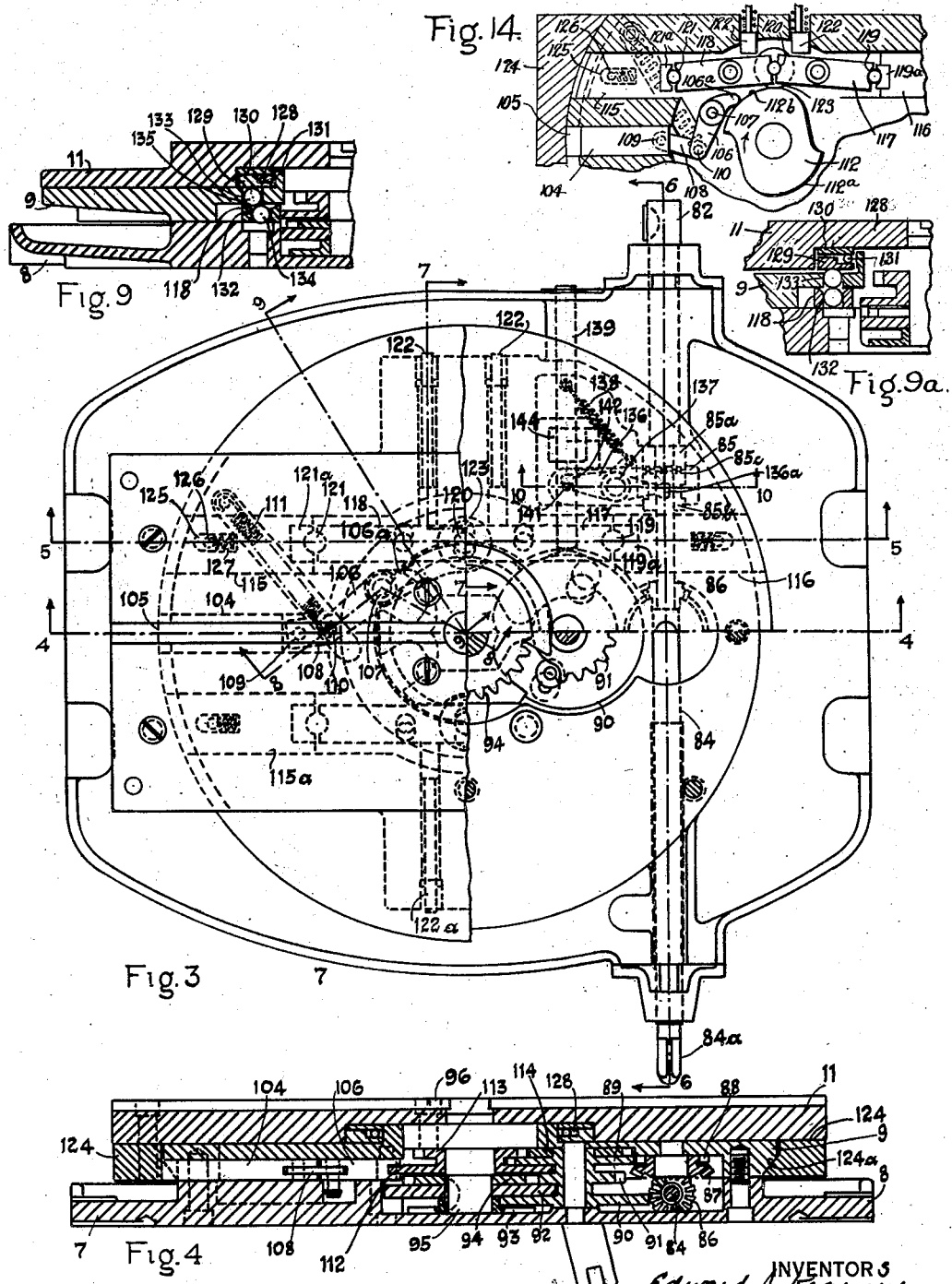

1,994,221

UNITED STATES PATENT OFFICE 1,994,221

MACHINE TOOL AND ATTACHMENT

Edward J. Kearney, Wauwatosa, and Joseph B. Armitage, Milwaukee, Wis., assignors to Kearney & Trecker Corporation, West Allis, Wis., a corporation of Wisconsin Application February 17, 1928, Serial No. 254,971

7 Claims. (Cl. 90—21)

This invention relates to machine tools, and more particularly to attachments therefor.

An object is to provide for machine tools having reciprocatory work or tool movements, an improved attachment adapted for rotary index movements.

Another object is to provide an attachment for rotary indexing with improved means for control of the index movement.

Another object is to provide an attachment having rotary index movements with improved means of driving and control from the driving and control means inherent in a machine tool, particularly the driving and control means for the reciprocatory work or tool movements thereof.

Another object is generally to improve and simplify the construction and operation of drive and control mechanism for rotary indexing and to simplify and improve the combinations of such mechanism with a machine tool; other objects relate to improved mechanism combining the various objects mentioned above, and still other objects will be apparent from the specification.

The invention consists of the construction herein illustrated, described and claimed, and in such modifications as may be equivalent to the structure claimed.

In the drawings, the same reference characters have been used for the same parts throughout.

Fig. 1 is a front elevation of a knee type milling machine including an improved rotary index attachment and embodying the invention.

Fig. 2 is a right side elevation of the same machine and attachment.

Fig. 3 is a plan view of the same attachment enlarged. In the upper right quadrant the rotary table member is broken away to show a plate member on which it rotates and in the lower right quadrant the plate member also is broken away.

Fig. 4 is a vertical section along line 4—4 of Fig. 3.

Figs. 5, 6, 7, 8, 9, 9a and 10, are vertical sections or partial sections along correspondingly marked lines of Fig. 3.

Fig. 13 is a rear view of the attachment and portions of the supporting structure.

Fig. 14 is a partial plan view in reduced size and mostly in section, showing clamps etc. also shown in Fig. 3, and certain operating mechanism.

Figures 11, 12:
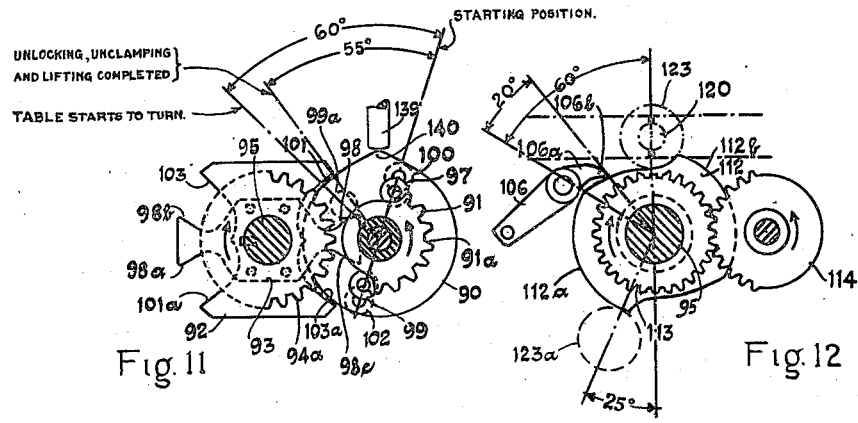
Figs. 11, 12, are diagrams showing the relation of certain mechanism shown in Fig. 3.
Figure 6:
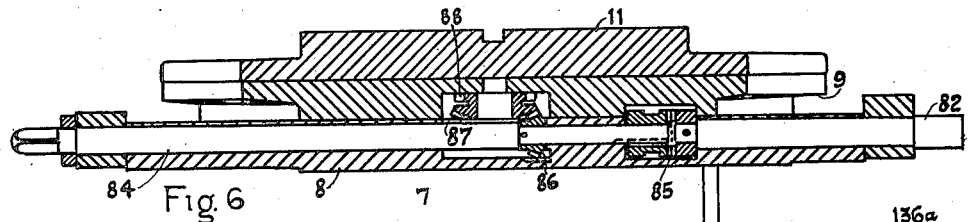
Figure 10:
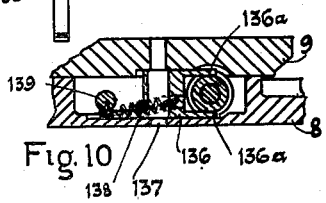
Figure 7:
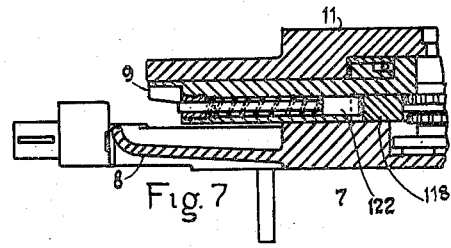
Figure 8:
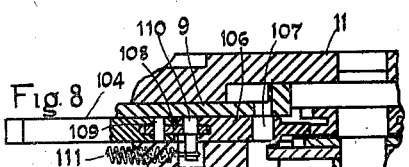

A column 1 supports a rotatable tool spindle 2, a rotatable drive pulley 3, a knee or support 4 guided on the front column wall for vertical adjustment, a saddle or support 5 guided on the knee for cross adjustment, and a table or support 6 guided on the saddle for longitudinal adjustment. Together such supports provide for reciprocable adjustment of table 6 in three transverse directions relative to spindle 2.

A base member 7 consisting of portion 8 and 9 fixed together is removably fixed on table 6 by the means of suitable clamps 10, of well known form. Mounted on base 7 for rotatable indexing movement is a work support or table 11. The base 7 and table 11 are portions of an attachment providing for a rotatable indexing movement of work pieces mounted on the table 11 in addition to the three transverse reciprocatory movements obtainable from the movable knee, saddle and table.

The slidable mountings of knee 4, saddle 5, and table 6 will not be described in detail since such do not vary from well known practice.

Spindle 2 may be driven from pulley 3 through transmission mechanism consisting of shaft 12, gears 13, 14, 15, a clutch generally denoted by the numeral 16, a shaft 17, a rate changer generally denoted by the numeral 18 and driving shaft 19, and gears 20 and 21 between shaft 19 and the spindle. The clutch 16 may be of any suitable type but in the drawings consists of a member 22 slidably keyed on shaft 17 and movable to engage or disengage complementary friction surfaces on the member and on the gear 15. The member 22 may be moved by the means of a hand lever 23 fixed on a shaft 24 upon which is also fixed a lever 25 having a pivoted shoe 26 engaging an annular groove 27 in the hub of the member. The rate changer 18 may be of any suitable form but in the drawings consists of the different diameter gears 28, 29, 30, fixed together and slidably keyed on shaft 17 and shiftable for engagement one at a time with complementary gears 31, 32, 33, fixed on shaft 19. Gears 28, 29, 30, may be shifted by the means of a hand lever 34 fixed on a shaft 35 upon which is also fixed a lever 36 having a pivoted fork 37 engaging the sides of the gear 29.

Thus spindle 2 may be connected or disconnected from pulley 3 by means of the clutch 16 and may be driven therefrom at different speeds according to the rate changer 18.

The machine table 6 may be power operated from pulley 3 through transmission mechanism consisting of the shaft 12, gears 13, 14, 15, clutch 16, shaft 17, a rate changer generally denoted by the numeral 38 and effective between shaft 17 and a shaft 39, an extensible universal joint shaft generally denoted by the numeral 40 and effective between shaft 39 and a shaft 41 movable with saddle 5, bevel gears 42, 43, shaft 44, gearing 45, 46, 47, a reverser generally denoted by the numeral 48 and a screw 49 journaled in the table and in threaded engagement with a nut 50 fixed in the saddle. The rate changer 38 may be of any suitable form but here consists of different diameter gears 51, 52, 53, fixed on shaft 17 and engagable one at a time by complementary gears 54, 55, 56 fixed together and slidably keyed on shaft 39, being shiftable by the means of a hand lever 57 fixed on a shaft 58, upon which is also fixed a lever 59 having a pivoted fork 60 engaging the sides of gear 55. Joint shaft 40 is of well known form providing for power connection between shafts 39 and 41 in any position of saddle 5. Reverser 48 may be of any suitable form but here consists of a bevel gear 61 fixed with gear 47 and meshing with two oppositely rotating bevel gears axially coinciding with, but free to rotate on screw 49. The gears 63, 64, are each provided with clutch teeth on the opposite ends of a sleeve 65 slidably keyed on screw 49, which will be driven in the one or the other direction accordingly as the sleeve 65 is shifted for the clutch teeth on the one or the other and to engage with the clutch faces of the bevel gears. The sleeve 65 may be shifted by the means of a hand lever 66 fixed on a shaft 67 upon which is also fixed a lever 68 having a pivoted shoe 69 engaging with an annular groove in the sleeve. By the above described mechanism table 6 may be driven from pulley 3 at any of a predetermined variety of rates in either direction, but only if clutch 16 is engaged to drive the spindle. Reverser 48 also acts as a motion interruptor for stopping the table movement at any point, the sleeve 65 having an intermediate unclutched position for such purpose.

The knee 4, machine table 6 and saddle 5 may each be manually moved. For this purpose knee 4 is provided with a screw 70 rotatably fixed against axial movement relative thereto and engaging a nut 71 fixed with the base of the column. Screw 70 may be manually rotated by the means of a shaft 72 connected with the screw by bevel gears 73, 74, and having a squared end 72a adapted to receive a suitable crank, not shown. The saddle may be moved by the means of a screw 75 rotatably fixed in knee 4 and having a squared crank end 75a and engaging a nut 76 fixed with the saddle. Table 6 may be moved by the means of a suitable crank applied to either squared end 49a or 49b of screw 49.

The table 11 may be driven from pulley 3 by the means of shaft 12, gears 13, 14, a gear 77 meshing with gear 14, shaft 78, gears 79, 80, a shaft 81, a shaft 82, Fig. 3, journaled in base 8 and driven from shaft 81 by the means of an extensible universal joint shaft of suitable form and generally denoted by the numeral 83, a shaft 84 axially aligned with shaft 82 and connectible therewith by the means of a motion interrupting clutch generally denoted by the numeral 85, bevel gears 86, 87, (Fig. 4) a gear 83 fixed with bevel gear 87, a gear 89 meshed with gear 88, and an indexing device. This device includes a driver member 90 and 91, Figs. 3, 4, 11, fixed with gear 89, and driven members 92, 93 and 94, fixed on a stud 95 which is axially concentric with the rotary movement of table 11 and fixed therewith by means of screws 96. Each rotation of the driver members gives to the driven members and to table 11 a half revolution, as follows. The parts being in the relative position shown in Fig. 11, engagement of clutch 85 will start the movement of members 90 and 91 in the arrow direction Fig. 11. A cam roller 97 pivoted on member 90 then contacts a cam face 98 on member 93 and starts turning stud 95 and table 11. The form of the cam face is such as to pick up the movement at a low angular rate and accelerate to a fast angular rate corresponding to the angular rate transmitted from a gear segment 91a on member 91 to a gear segment 94a on a member 94, and the parts are positioned to swing the segments into mesh, after which the segments transmit a uniform high angular rate until they revolve out of engagement owing to the cut away portions. Just before such disengagement a cam surface 98b will have been rotated to contact with a roller 99, then positioned approximately as indicated by the dotted outline 99a. After the segments disengage, the relation of cam face 98 and roller 99, as they move, is such as to force a deceleration of the angular velocity of the table until the table is again stationary having completed a half revolution, although members 90 and 91 have completed a full revolution, after which clutch 85 is disengaged as will be later described.

A cam roll 100 pivoted on member 90 acts against a cam face 101 on member 92 during acceleration and a cam roll 102 on member 90 acts against a cam face 103 on member 92 during deceleration which in combination with the described cams and rolls, insure that the driven parts cannot be angularly displaced from the predetermined instantaneous positions.

The half revolution of the table 11 positions similar cam grooves 98a, 98c, 101a and 103a for similar action during another half revolution, and such indexing of table 11 may be repeated indefinitely.

Means are provided for accurately positioning the table 11 as follows. A locating plunger 104, Figs. 3, 4, 14 is slidably fitted in a suitable slot in base 9 and may engage with notches positioned at 180 degrees in table 11, one of which is shown at 105, Figs. 3-14. A lever 106 pivoted on stud 107 is connected with plunger 104 by the means of a pivoted link 108 having pivot pins 109, 110. A spring 111 pulls the lever and link in a direction to engage the plunger with the slots and swings an arm 106a of lever 106 toward a two lobed cam 112, Figs. 4 and 12, rotatable on stud 95. Cam 112 is revolved by the means of a gear 113 fixed therewith and engaged by a mutilated gear 114 fixed with gear 89. The parts are in the position shown in Fig. 12 at the time that the table indexing movement of member 90 is started, but during an interval before the table starts to move the cam 112 has moved sufficiently that the point 106a of lever 106 has been forced back by the cam portion 112a, thereby disengaging the plunger 104 to permit the table to turn.

The teeth of gear 114 are cut away over a considerable portion of the periphery and after cam 112 has been moved sufficiently to withdraw the index plunger the cut away portion fails to drive it farther until after the table has completed its index movement, after which the teeth of gear 114 again engage with gear 113 and complete a half revolution of the cam 112. The parts then stand again as in Fig. 12 except that it is now the other lobe of cam 112 which co-acts with lever 106 and the cut away portion thereof permits spring 111 to re-engage the locating plunger.

Figure 5:
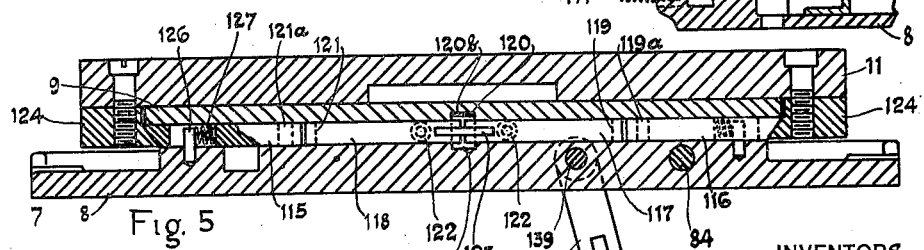

Means are provided for clamping and releasing the table 11 and base 9, as follows. A pair of plungers or sliding members 115, 116, Figs. 3, 5 and 14, are guided in suitable slides in base 9. The members may be thrust apart endwise by the means of a toggle device including members 117, 118, the toggle pivots including pins 119, 120, 121, suitably seated in opposed members, there being removable blocks 121a and 119a providing seats in members 115 and 116 respectively. The members are continuously pressed in the one direction by spring pressed plungers 122 positioned for a combined thrust and in the other direction may be moved against the pressure of the plungers by the means of the cam surfaces 112a and 112b on cam 112, Figs. 12–14, which as previously described also serves to move the plunger 104. The cam surfaces act against a roller 123 associated with pivot pin 120. In the position of the parts when the table is stationary the cam is cut away sufficiently that the spring plungers move the toggle to thrust the ends of clamp plungers 115, 116, strongly against angular bearing surface 124a of blocks or abutments 124 fixed on table 11 thereby pulling the table downwardly to seat its lower surface against the top surface of the base, whereby a large clamping friction is set up both between the plunger ends and the angular abutment surface and between the opposed table and base surfaces. Cam 112 is driven as previously described to move before the table moves and such movement is sufficient to cause the cam surfaces 112a or 112b to thrust against the spring plungers to relieve such pressure before the table starts to turn, the position of the parts then being as shown in Fig. 14. After the table movement is completed and locating plunger 104 had entered its notch as previously described, the cut away cam portions permit the spring plunger to again clamp the table.

The ends of the pivot pin 120 are extended to move in slots 120b, Figs. 3 and 5, which are sufficiently free to avoid binding during clamping. Slots are also provided in the toggle members as at 125 to provide space for pins as pin 126 fixed in the base and springs as spring 127 which thrust the toggle members toward the central pivot pin, thus tending to prevent the clamp ends from dragging on the rotating table parts and, in co-operation with the slots for the central pivot pin keeping the entire toggle mechanism centrally located and in proper position at all times.

In addition to the clamping mechanism just described there is an exact duplication of such mechanism oppositely disposed with reference to the table axis. A portion of such duplicate mechanism is shown in Fig. 3 including clamp plunger 115a and spring plunger 122a.

When the table 11 is unclamped, and during its turning movement the weight of the table is lifted from the top bearing surface of the base and supported on an anti-friction bearing as follows. A thrust bearing generally denoted by the numeral 128 Figs. 4–9–9a, consists in this instance of a lower ring or thrust plate 129, an upper ring or thrust plate 130 and a series of balls, of which ball 131 is typical, arranged to roll between the rings. The combined vertical thickness of the rings and balls is slightly less than the recess space provided therefor between the base and table, but during unclamping the lower plate is thrust upward to lift the table through the thrust bearing, the position of the parts then being as shown in Fig. 9a. For this purpose each of the toggle parts 117, 118, and the similar oppositely disposed parts referred to, are provided with associated lifting means of which the means illustrated in Figs. 9–9a for the toggle part 118 is typical, consisting of a bore 132 in part 118, a bore 133 in base plate 9 and balls 134, 135, in the respective bores. The arrangement is such that as the toggle member 118 is moved as described for clamp release, the ball 134 presses ball 135 and bearing 128 upward until the table is lifted and is supported by the bearing, the balls of the several toggle members providing four points of support for the bearing symmetrically arranged about the table axis. Thus the table 11 is lifted from its base bearing before it starts to turn and is dropped again before clamping, but after the plunger 104 has operated to relocate the table. Such action has many advantages, principally that wear is avoided and the decreased friction enables the plunger 104 to more accurately position the table.

The relative timing of the above described movements is determined by the form and relative position of the parts, and is particularly advantageous in that a relatively very large part of the total time consumed is utilized for turning the table 11, giving a relatively slow maximum table movement. Thus the strains due to table inertia, both in acceleration and deceleration which are materially reduced by the substantially harmonic motion of the table during such periods, are still farther reduced. This is illustrated in the diagrams, Figs. 11 and 12. The parts arranged about the two centers move in the direction of the arrows and the parts are shown in the position occupied when the table is stationary. When the indexing operation starts, both the member 112 and member 90 start to move immediately. After approximately 20 degrees of movement of member 112, lever 106 has completely withdrawn locking plunger 104, as shown in Fig. 12. After a further movement for a total of approximately 60 degrees movement of member 112, the table is completely unclamped, the action being apparent for the clamp roller 123, Fig. 12, and being similar for the roller of the other clamp. A 60 degree movement of member 112 is, owing to the ratio of gears 114 and 113, equivalent only to approximately 55 degrees of movement of gear 114, and of member 90 fixed therewith, as indicated on Fig. 11. After approximately 60 degrees of movement of member 90, the roller 96 contacts cam face 98 as indicated by the dotted line position 99a and table 11 starts to move. At completion of the 180 degree table movement, the member 112 has moved through an angular distance such that the roller 123 now stands approximately in the relative position indicated at 123a. The movement of member 112 has not been uniform, there having been a considerable dwell caused by the cut away portion of gear 114. After a further movement of approximately 25 degrees of member 112, corresponding to approximately 23 degrees of member 90, the member 112 has again permitted the table clamps to operate and the member 90 trips out the clutch member 85b as will be described and the indexing is completed. Member 90 has 360 degrees of movement of which approximately 60 degrees are used before the table starts to move and approximately 23 degrees after the table has completed its movement, giving approximately 277 degrees for table movement whereby such movement may be relatively slow.

The above movements of indexing, clamping and lifting the table 11 are performed by power derived from shaft 82 and controlled by clutch 85. Clutch 85 in this instance consists of a member 85a fixed on shaft 82 and a member 85b slidably keyed on shaft 84 the members being provided with complementary clutch teeth 85c adapted to engage or disengage as member 85b is properly moved. Member 85b may be moved by the means of a lever 136 pivoted on a stud 137, Figs. 3 and 10, having fork members 136a engaging an annular groove in member 85b. Lever 136 is continuously urged to engage clutch member 85b by the means of a spring 138, which simultaneously acts on the lever and on a rod 139, tending continuously both to turn the rod and to pull it toward the periphery of drive member 90, with which the rod end contacts, Fig. 11.

When clutch member 85b is disengaged the end of rod 139 rests against a cam portion 140 on the periphery of member 90, Fig. 11, and a pin 141 fixed in rod 139 rests against an abutment portion 142 on lever 136, and the lever end is pulled against pin 141 as an abutment preventing the spring from causing engagement of the clutch member. For causing clutch engagement rod 139 is provided with a lever 144, Figs. 3, 5, and 13, the slotted end of which engages a pin 145 fixed in a rod 146 slidably supported in brackets 147, 148, for movement with table 6. The sliding movement of rod 146 is limited in one direction by a collar 149 fixed on the rod to abut the bracket 147, and in the other direction by a shoulder 150 on a sleeve 151 fixed on rod 146 for the shoulder to abut the bracket. The rod 146 is yieldingly pressed to the left in Fig. 13 by the means of a spring 152 which thus assists spring 138 in urging the rod 139 for pin 141 to rest against abutment 142. Preferably collar 149 abuts bracket 147 just before pin 141 strikes its abutment 142.

Sleeve 151 is knob-shaped for manual operation of rod 146 to the right in Fig. 13, and if so operated rod 139 is turned sufficiently to disengage pin 141 from the end 142 of lever 136, whereupon spring 138 immediately engages clutch member 85b and a power index movement of table 11 starts. But as soon as member 90 has turned sufficiently, a cut away portion of its periphery permits rod 139 to be pulled by spring 138 to a position where pin 141 may again engage end of lever 136 and again rest against the abutment 142. Subsequently when the cam portion 140 of member 90 has revolved to contact the rod 139, the cam portion pushes the rod back to the position shown in Fig. 3 and withdraws clutch member 85b from engagement, the table 11 having completed a half revolution and the associated table clamping, lifting and locating mechanism having gone through the cycle of movement as previously explained.

In practice the device is used as illustrated by the following example. A work piece 153, Fig. 1 is fixed to the table 11 by the means of a suitable holding fixture 154. The machine table 6 is then fed to the left in Fig. 1 for a cutter such as gang 155 operated from spindle 2, to act on the work piece. After the cutter has passed over the work piece the table movement is reversed by the means of lever 66 and reverser 48, to return to its starting position. As soon as it is sufficiently retreated for the cutter to disengage from the work piece, the table 11 is caused to index through a half revolution, thereby bringing into cutting alignment a second work piece 156 fixed on the opposite side of the axis of table 11 by the means of a second fixture 157. During cutting of such second work piece the first or finished work piece is removed and an unfinished piece inserted. Such operation may be continued indefinitely. To avoid the necessity for hand trip of the indexing, the index movement may be controlled from the movements of the machine tool members as follows: A dog 158, Fig. 13, is fixed on saddle 5 to act against a trip member 159 adjustably fixed on rod 146. During the return movement of table 6, to the left in Fig. 13, the dog point contacts the point of a plunger 160, slidable in trip member 159 and pressed outwardly by the means of a spring 161 to contact the dog. Spring 161 is sufficiently strong to overcome springs 152 and 138, and rod 146 is moved to start the indexing, but if table 6 should be required to retreat a further amount, the rod 146 is stopped by the shoulder 150 on sleeve 151 and the plunger 159 retreats to let the dog pass. During forward table movement the rod is prevented from movement by the collar 149 and the plunger retreats to let the dog pass without moving rod 146.

Table 11 may be indexed by hand as well as by power. The shaft 84, Fig. 3, is extended and a projecting end 84a is squared to receive a suitable crank, not shown. Manual rotation of the shaft 84 will cause the table to go through its cycle including all the movements described above.

Table 6 may be provided with well known control devices for causing its automatic reversal at either or both ends of its reciprocatory movement and with well known devices for increased rate of travel during idle or non-cutting movements, thus providing automatic control of all the relative work and tool movements, but such control devices for table 6 being well known in various forms are not shown.

What is claimed is:

1. A machine tool comprising a tool spindle, a reciprocable support, an indexable table carried by said support adjacent said spindle, a drive train for said spindle including a motion interrupting clutch, a first branch train from said drive train to said support and connected to be driven through said clutch, a second branch train for the indexing of said table connected with said drive train to exclude said clutch and including engageable clutch members, means actuated from said first branch train for causing engagement of said clutch members and means actuated from said second branch train for disengaging said clutch members.

2. A machine tool comprising a rotatable tool spindle, a reciprocable support, a table rotatably indexable on said support, a power source, a first power train connecting said source a motion interrupting clutch and said spindle in the order named, a second power train connected with said power source through said clutch and with said support and including a reverser, a third power train connected with said power source independently of said clutch and including a clutch controlled indexing device; and means for controlling the clutch of said device including clutch engaging trip members actuated for relative movement through said reverser, and clutch disengaging trip members actuated for relative movement through the last mentioned clutch.

3. A machine tool comprising a rotatable tool spindle, a reciprocable support, a table rotatably indexable on said support, a power source, a first train connecting said source and spindle through a motion interrupting clutch, a second power train driven from said first train through said clutch and connected with said support through a rate changer, a third train driven from said first train exclusive of said clutch and connected with said table through a clutch controlled indexing device; and means for controlling the clutch of said device including clutch engaging trip members actuated through said rate changer for relative movement, and clutch disengaging trip members actuated through the last mentioned clutch for relative movement.

4. In a milling machine the combination of a base, a rotatably indexable table, said table and base having surfaces mutually contacting for support of said table, a clamp member having opposite movements respectively for unclamping and for clamping engagement of said surfaces, a rotatable driver, intermittent gearing connecting said driver and clamp member for said opposite movement respectively during a first and a last portion of a revolution of said driver, and a transmission train connecting said driver and table including intermittent gearing connecting said table to be rotated from said driver only during an intermediate portion of said driver revolution, and cam means operative during other portions of said driver revolution to accelerate and to decelerate the rotation of said table.

5. In a milling machine the combination of a rotatable tool spindle, a support movable relative thereto in a cutting direction and in the reverse direction, a table carried by said support and adapted to be rotatably indexed about an axis transverse both to the axis of said spindle and to the path of support movement, a first drive train for rotation of said tool spindle including in the order recited a power source, a motion interrupting clutch and said spindle, a second drive train for movement of said support and connected with said power source through said clutch, a third drive train for movement of said table and connected with said power source independently of said clutch and including clutch members relatively shiftable for engagement and for disengagement, trip means for engagement of said clutch members and operable from said second train only during said reverse direction of support movement, and power means for the subsequent disengagement of said clutch members after said table has completed a predetermined indexing movement.

6. In a milling machine the combination of a rotatable tool spindle, a support movable relative thereto in a path transverse to the axis of said spindle and in a cutting direction and in the reverse direction, a table carried by said support and indexable to present different work pieces one after another to be operated upon by said cutter, a spindle transmission including in the order recited a power source, a motion interrupting clutch and said spindle, a first branch line transmission for movement of said support in either of said directions and connected to be actuated from said power source through said clutch, a second branch line transmission for indexing movement of said table and connected to said power source independently of said clutch, said second branch line including clutch members relatively shiftable for establishing and interrupting said indexing movement, trip means for shifting said clutch members to establish said indexing movement and operable from said first branch line only during said reverse movement of said support, and power means for subsequently shifting said clutch members to interrupt said indexing movement.

7. In a milling machine the combination of a rotatable cutter spindle, a table rotatably indexable adjacent said spindle, said spindle and table being relatively bodily movable in a cutting and in a return direction, a spindle transmission including in the order recited a power source, a motion interrupting clutch and said spindle, a power train for one of said directions of relative bodily movement and driven from said source through said clutch, a power train for indexing said table and connected to be driven from said source at a point unaffected by said clutch, said train including members relatively movable to establish and to interrupt index movement of said table, automatic means for movement of said members during said return movement of said table to establish table index movement, and automatic means to subsequently move said members to interrupt index movement; whereby said table may be automatically indexed during a return movement of said support and during a period when said spindle is idle.

EDWARD J. KEARNEY.
JOSEPH B. ARMITAGE.